US006950572B2

(12) United States Patent
Hamada et al.

(10) Patent No.: US 6,950,572 B2
(45) Date of Patent: Sep. 27, 2005

(54) OPTICAL COUPLER

(75) Inventors: Tsutomu Hamada, Ashigarakami-gun (JP); Junji Okada, Ashigarakami-gun (JP); Takehiro Niitsu, Ashigarakami-gun (JP); Hidenori Yamada, Ashigarakami-gun (JP); Hiroshi Oikawa, Ebina (JP); Mitsuo Shiraishi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 197 days.

(21) Appl. No.: 10/305,073

(22) Filed: Nov. 27, 2002

(65) Prior Publication Data

US 2003/0123803 A1 Jul. 3, 2003

(30) Foreign Application Priority Data

Dec. 7, 2001 (JP) ...................................... 2001-373571

(51) Int. Cl.[7] .................................................. G02B 6/26

(52) U.S. Cl. ........................................... 385/31; 385/15

(58) Field of Search .............................. 385/31, 48, 15

(56) References Cited

U.S. PATENT DOCUMENTS 4,302,069 A * 11/1981 Niemi ......................... 385/46
5,054,877 A * 10/1991 Ortiz et al. ................... 385/33

* cited by examiner

*Primary Examiner*—Jennifer Doan
(74) *Attorney, Agent, or Firm*—Oliff & Berridge, PLC

(57) ABSTRACT

A diffusion part diffuses an optical signal emitted from the end face of an optical fiber of an input light guide. An input reflection part reflects the optical signal diffused by the diffusion part in the direction of an output reflection part. A transparent medium guides the optical signal reflected by the input reflection part in the direction of the output reflection part. Output reflection parts reflect optical signals guided in the transparent media in the direction of optical fibers of output light guides. The optical signal reflected by the output reflection part is incident on the end face of the optical fiber and is transmitted over the output light guide.

11 Claims, 8 Drawing Sheets

3

OPTICAL COUPLER

The present disclosure relates to the subject matter contained in Japanese Patent Application No.2001-373571 filed on Dec. 7, 2001, which is incorporated herein by reference in its entirety.

BACKGROUND OF THE INVENTION

1. Field of the Invention

This invention relates to an optical coupler for splitting an optical signal.

2. Description of the Related Art

Used as an optical coupler for splitting an optical signal incident from one optical fiber and emitting to a plurality of optical fibers is an optical coupler in which a sheet-like light guide and an optical fiber are joined.

If such an optical coupler and optical fiber are joined using a connector, the joint of the optical coupler and optical fiber weakens and the signal loss increases, and the structure of the connection part of the optical coupler and optical fiber becomes complicated.

In such a case, it is also difficult to increase the number of outputs of the optical coupler.

SUMMARY OF THE INVENTION

It is therefore an object of the invention to provide an optical coupler capable of holding a sufficiently strong joint with a large number of optical fibers with a small signal loss if the number of outputs increases.

It is another object of the invention to provide an optical coupler capable of holding signal loss low if the structure of the joint portion with optical fibers is simple.

It is further another object of the invention to provide an optical coupler capable of splitting an optical signal into a large number of branches.

To the ends, according to the invention, there is provided an optical coupler including a light split device and a light guide acceptance member. The light split device receives an optical signal incident from at least one incidence section placed on a light incidence/emission plane, splits the incident optical signal into a plurality of optical signals, and emits the optical signals from a plurality of emission sections placed on the light incidence/emission plane. The light guide acceptance member includes an acceptance section for accepting at least one incidence light guide for guiding an optical signal into the at least one incidence section and a plurality of emission light guides for guiding the optical signal emitted from the plurality of emission sections, respectively. The plurality of emission light guides are placed on the light incidence/emission plane.

According to the invention, there is provided an optical coupler including a light split device, a retention member, at least one first light guide, a plurality of second light guides, and a light guide acceptance member. The light split device accepts an optical signal incident from at least one incidence section placed on a first plane, splits the incident optical signal into a plurality of optical signals, and emits the optical signals from a plurality of emission sections placed on a second plane. The retention member retains the light split device. The at least one first light guide guides an optical signal into the at least one incidence section placed on the first plane from a light incidence/emission plane of the retention member. The plurality of second light guides guide each of optical signals from each of plurality of emission sections placed on the second plane into the light incidence/emission plane of the retention member. The light guide acceptance member has an acceptance section for accepting a plurality of third light guides each for guiding the optical signal between the first light guide and third light guides and guiding the optical signals between the second light guide and the third light guide. The third light guides are placed on the light incidence/emission plane of the retention member.

BRIEF DESCRIPTION OF THE DRAWINGS

In the accompanying drawings:

FIG. 3A is a top view of the light split section 2 and FIG. 3B is a side view of the light split section 2.

FIG. 5A shows a flow of an optical signal viewed from the side of the transparent medium and FIG. 5B shows a flow of an optical signal viewed from the top of the transparent medium;

FIG. 6A is a perspective view and FIG. 6B is a sectional view;

FIG. 7A is a perspective view and FIG. 7B is a sectional view;

DETAILED DESCRIPTION OF THE PREFERRED EMBODIMENTS

An embodiment of the invention will be discussed.

Figure 1:
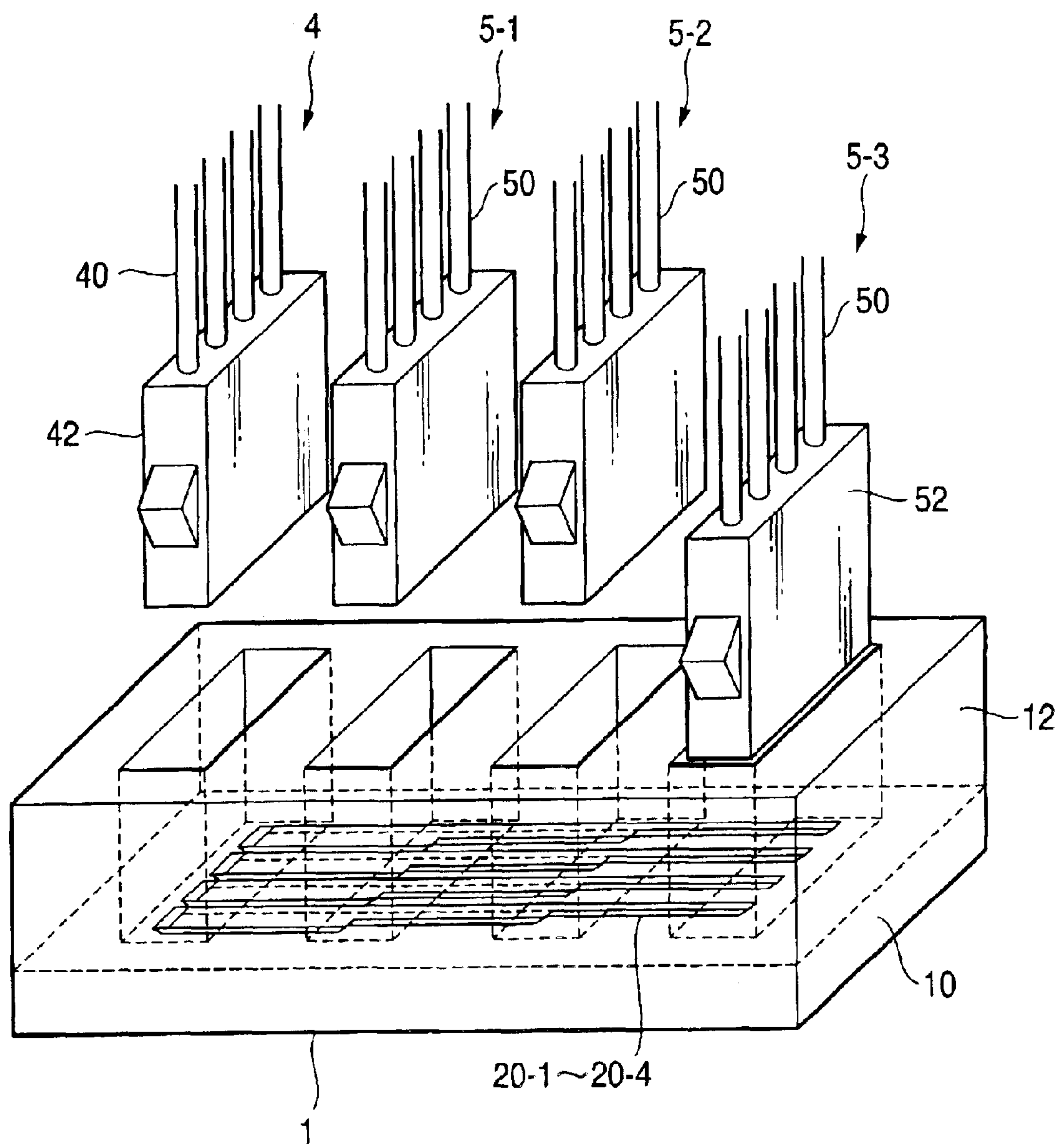
FIG. 1 is a perspective view of an optical coupler according to the invention.

FIG. 1 is a perspective view of an optical coupler 1 according to the invention.

As shown in FIG. 1, the optical coupler 1 according to the invention accepts one or more input light guides 4 each including one or more optical fibers 40 and a plurality of output light guides 5-1 to 5-I each including one or more optical fibers 50 via connectors 42 and 52. The optical coupler 1 splits an optical signal input from the input light guide 4 and outputs the split optical signals from the output light guides 5-1 to 5-I (I is an integer of 2 or more).

The optical coupler 1, the input light guides 4, and the output light guides 5 can adopt various configurations; in the description that follows, the following case is taken as a specific example to concrete and simplify the description:

The optical coupler 1 accepts one input light guide 4 and three output light guides 5(I=3).

The input light guide 4 includes four optical fibers 40 and the output light guides 5 include each four optical fibers 50.

The input light guide 4 and the output light guides 5 are accepted from the same side of the optical coupler 1.

To indicate any one of a plurality of components, for example, any one of the output light guides 5-1 to 5-I, it is also represented simply as output light guide 5, etc.

Figure 2:
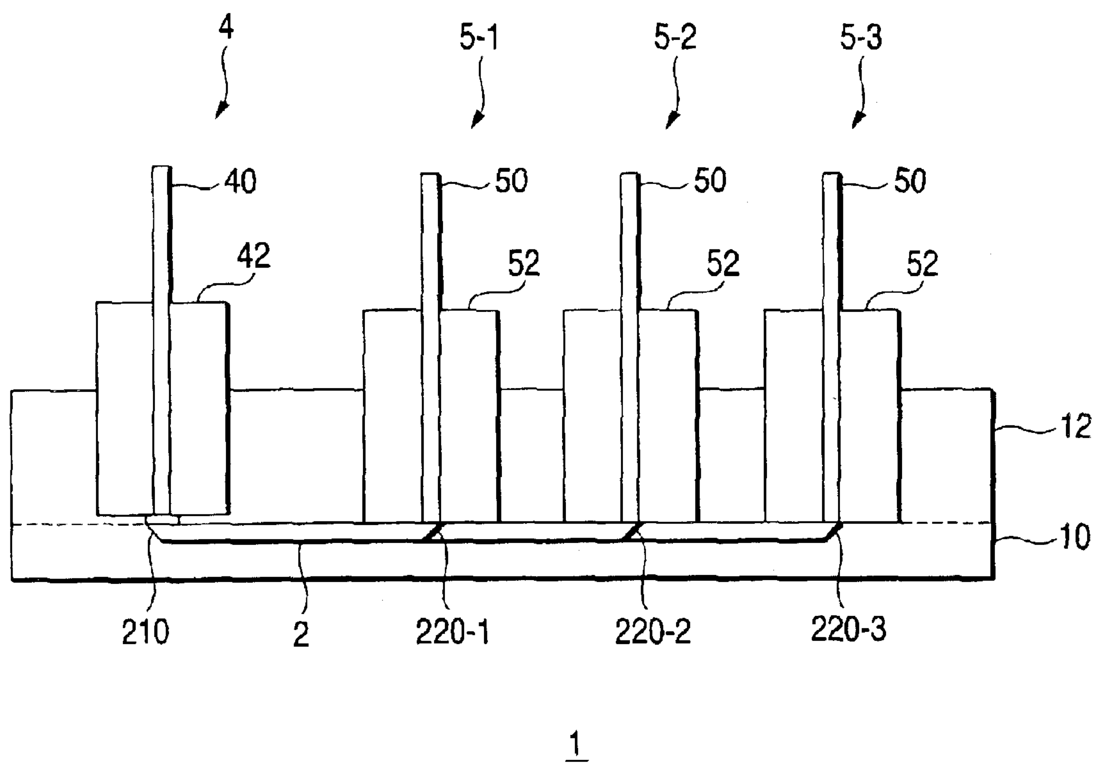
FIG. 2 is a sectional view of the optical fiber shown in FIG. 1.

FIG. 2 is a sectional view of the optical coupler 1 shown in FIG. 1.

Figure 3A:
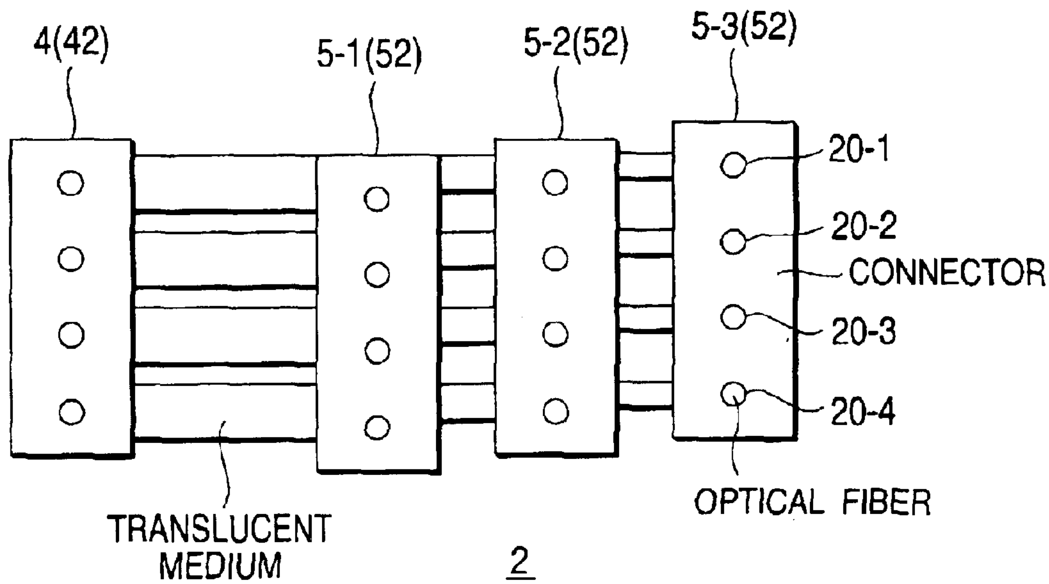
FIGS. 3A and 3B are drawings to show the configuration of a light split section 2 shown in FIG. 2.
Figure 3B:
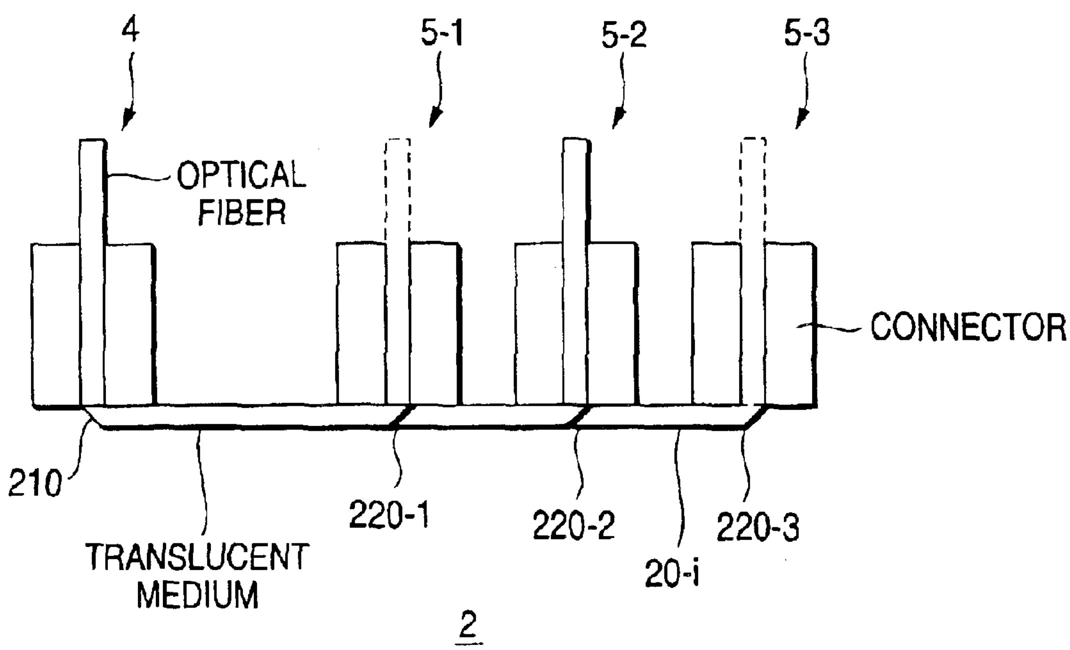

FIGS. 3A and 3B are drawings to show the configuration of a light split section 2 shown in FIG. 2; FIG. 3A is a top view of the light split section 2 and FIG. 3B is a side view of the light split section 2.

Figure 4:
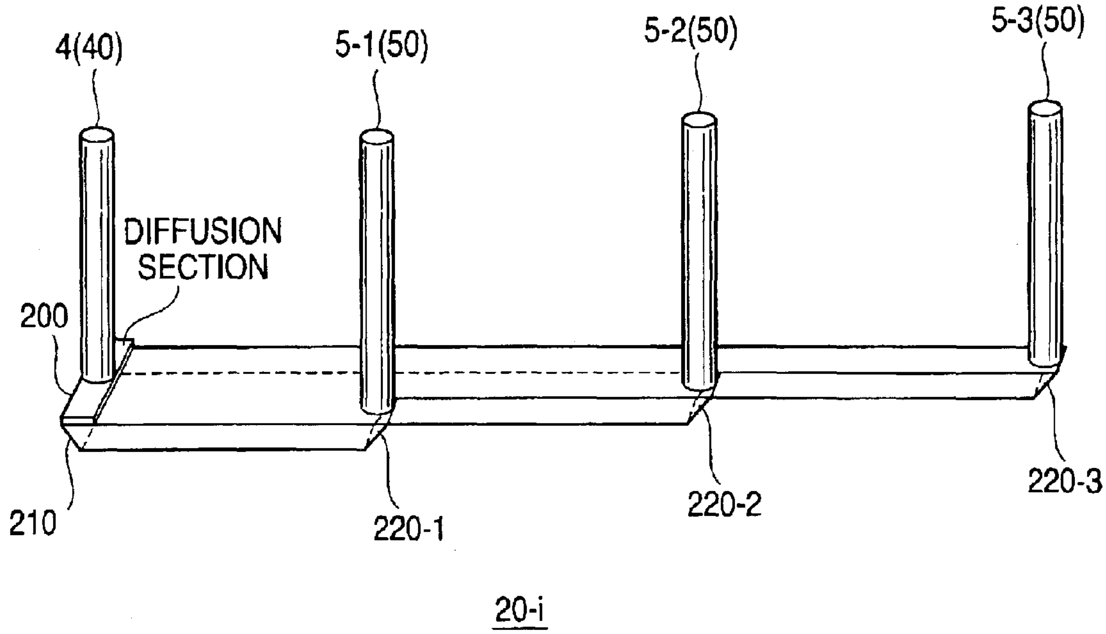
FIG. 4 is a perspective view of the light split section shown in FIGS. 2 and 3 and shows the positional relationship among the optical fibers, a light incidence section, and light emission sections.

FIG. 4 is a perspective view of the light split section 2 shown in FIGS. 2 and 3 and shows the positional relationship among the optical fibers 40 and 50, a light incidence section 210, and light emission sections 220-1 to 220-3.

As shown in FIG. 2, the optical coupler 1 includes a light split section 2, a board 10, and a connector acceptance section 12.

The light split section 2 is buried in the board 10 for retention and is covered by the connector acceptance section 12.

The connector acceptance section 12 may be formed of an opaque material to have a light shield property.

As shown in FIGS. 3A, 3B, and 4, the light split section 2 includes stepwise transparent media 20-1 to 20-4, which are acrylic resin formed like a sheet, for example.

A diffusion part 200 is placed in a portion opposed to the end face of the optical fiber 40 on a plane where the transparent medium 20-i (i=1 to I (=4)) contacts with the connector acceptance section 12 (incidence/emission plane).

For example, a transparent optical element, which is made of polycarbonate and has minute concavity and convexity on a light incident side surface thereof, is used as a diffusion part.

In a portion of the transparent medium 20-i opposed to the optical fiber 40, namely, in the proximity of the position where the diffusion part 200 is disposed, an input reflection part 210 is formed so as to have an angle of 45 degrees, for example, with respect to the place contacting with the connector acceptance section 12.

In portions of the transparent medium 20-i opposed to the optical fibers 50 of the output light guides 5-1 to 5-3, like the input reflection part 210, output reflection parts 220-1 to 220-3 are formed so as to have an angle of 45 degrees, for example, with respect to the place contacting with the connector acceptance section 12.

The connector acceptance section 12 accepts connectors 42 and 52 of the input light guide 4 and the output light guides 5 so that the optical fibers 40 and 50 abut against the light split section 2.

Figure 5A:
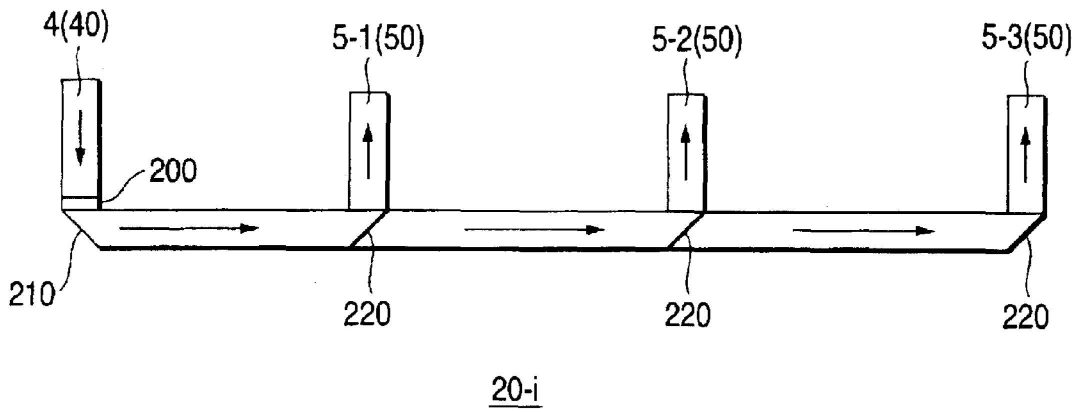
FIGS. 5A and 5B are drawings to show a flow of an optical signal in a transparent medium shown in FIG. 3, etc.
Figure 5B:
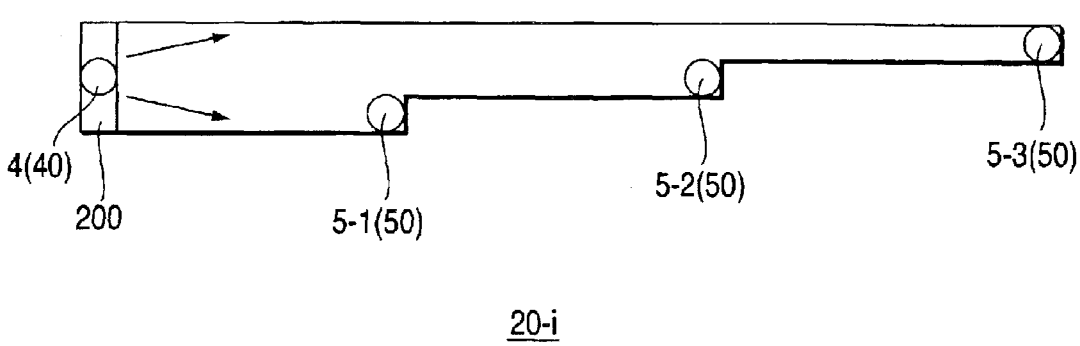

FIGS. 5A and 5B are drawings to show a flow of an optical signal in the transparent medium 20-i shown in FIG. 3, etc.; FIG. 5A shows a flow of an optical signal viewed from the side of the transparent medium 20-i and FIG. 5B shows a flow of an optical signal viewed from the top of the transparent medium 20-i.

As FIGS. 5A and 5B, the diffusion part 200 diffuses an optical signal emitted from the end face of the optical fiber 40 of the input light guide 4.

The input reflection part 210 reflects the optical signal diffused by the diffusion part 200 in the direction of the output reflection parts 220.

The transparent medium 20 guides the optical signal reflected by the input reflection part 210 in the direction of the output reflection parts 220.

The output reflection parts 220-1 to 220-3 reflect the optical signals guided in the transparent media 20 in the direction of the optical fibers 50 of the output light guides 5-1 to 5-3.

The optical signal reflected by the output reflection part 220 is incident on the end face of the optical fiber 50 and is transmitted over the output light guide 5.

Incidentally, when the diffusion part is not disposed as shown in FIG. 3, since incident positions of the optical signals are not limited, a part of the output reflection parts may be used as the input reflection part.

Figure 6A:
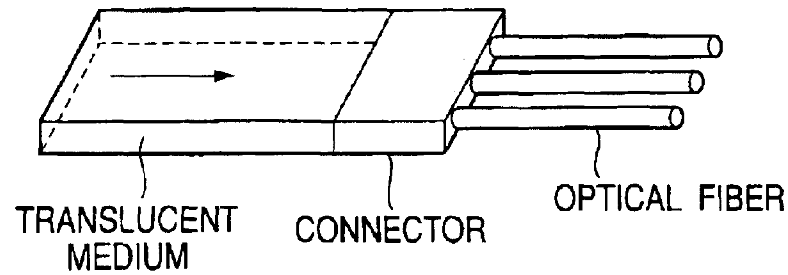
FIGS. 6A and 6B are drawings to illustrate a first optical coupler using a transparent medium formed like a sheet.
Figure 6B:
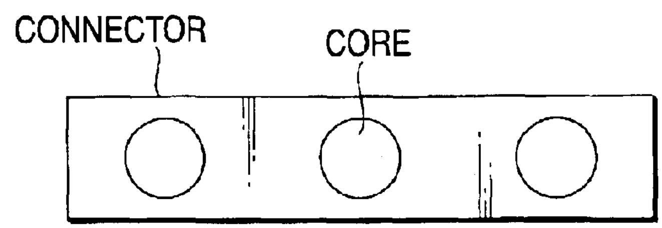
Figure 7A:
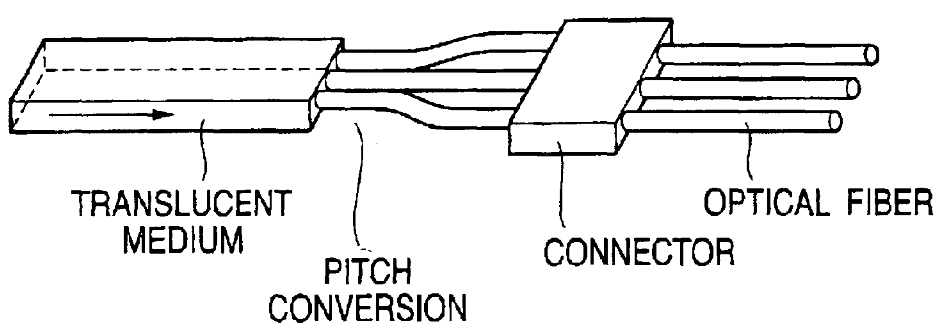
FIGS. 7A and 7B are drawings to illustrate a second optical coupler using a transparent medium formed like a sheet.
Figure 7B:
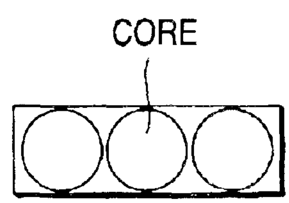

FIGS. 6A and 6B and 7A and 7B are drawings to illustrate optical couplers each using a transparent medium formed like a sheet; FIGS. 6A and 7A are perspective views and FIGS. 6B and 7B are sectional views.

It is seen from the optical coupler shown FIGS. 6A and 6B that the occupation percentage of the end face of the optical fiber is small on the light emission plane of the transparent medium.

In contrast, in the optical coupler 1 previously described with reference to FIGS. 1 to 5, most of the optical signal reflected by the output reflection part 220 can be made incident on the end face of the optical fiber 50.

Therefore, it is seen that the loss of the optical signal in the optical coupler 1 is smaller than that of the optical signal in the optical coupler shown in FIGS. 6A and 6B.

In the optical coupler shown in FIGS. 7A and 7B, the occupation percentage of the end face of the optical fiber on the light emission plane of the transparent medium is increased as compared with the optical coupler shown in FIGS. 6A and 6B, but pitch conversion of the optical fiber is required and the structure is complicated.

In contrast, the structure of the optical fiber 1 is simpler than that of the optical coupler shown in FIGS. 7A and 7B.

Modification

Figure 8:
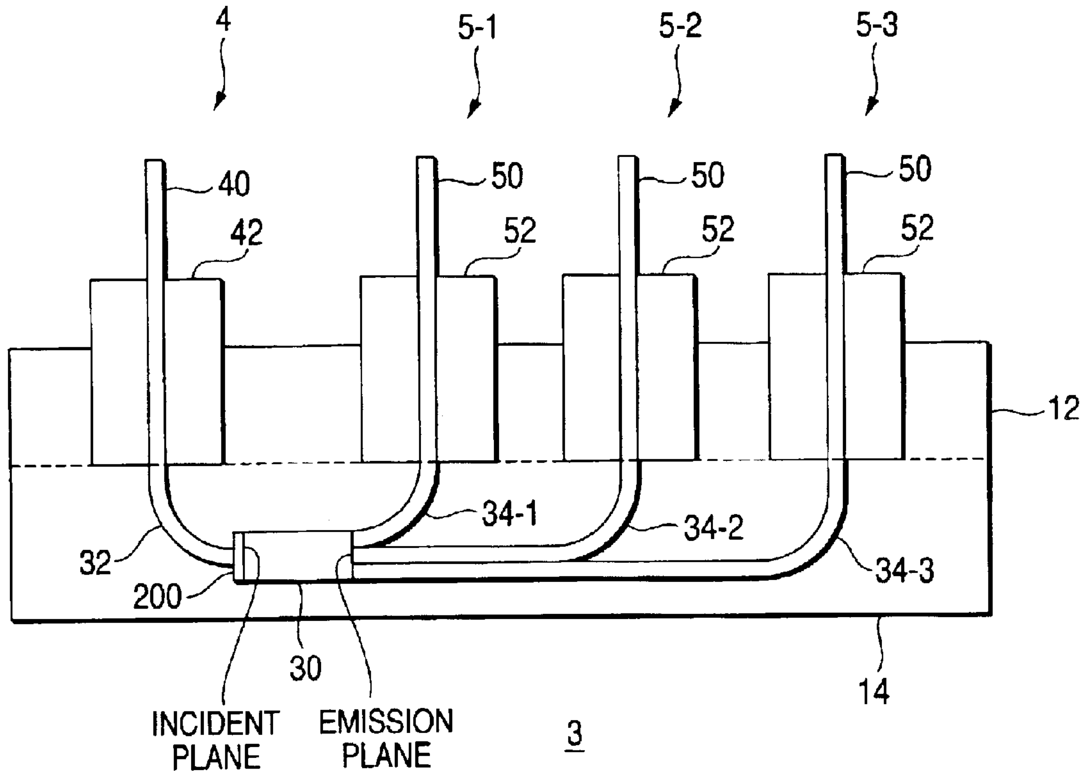
FIG. 8 is a drawing to show the configuration of another optical coupler according to the invention.

FIG. 8 is a drawing to show the configuration of a second optical coupler 3 according to the invention.

As shown in FIG. 8, in the optical coupler 3, a diffusion part 200 is disposed on the incidence plane of a transparent medium 30 and diffuses an optical signal guided from an optical fiber 40 of an input light guide 4 through an optical fiber 32.

Optical fibers 34-1 to 34-3 abut against the emission plane of the transparent medium 30 for guiding the split optical signal into optical fibers 50 of output light guides 5-1 to 5-3 accepted by a connector acceptance section 12.

The transparent medium 20 of the optical coupler 1 can be replaced with the transparent medium 30, the optical fiber 32, and the optical fibers 34-1 to 34-3 as shown in FIG. 8.

Figure 9A:
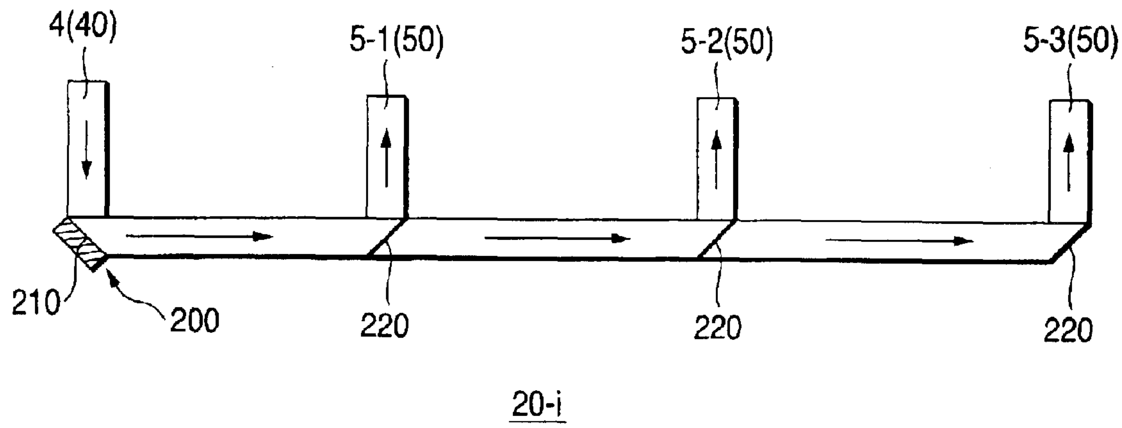
FIGS. 9A and 9B are drawings to show a modified embodiment of this invention.
Figure 9B:
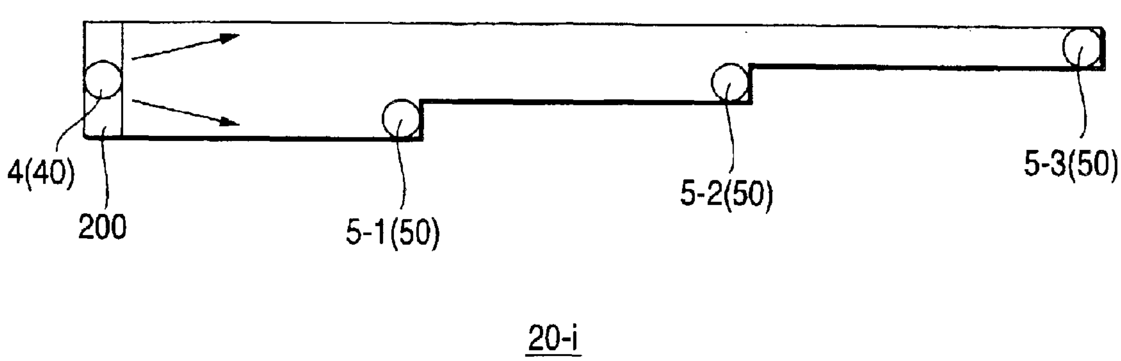

The shape of the transparent medium 20 may be changed, the input reflection part 210 may be placed so as to reflect an optical signal to one plane (reflection/diffusion plane) of the transparent medium 20, the optical signal may be diffused and reflected by the diffusion/reflection plane, and the diffused optical signal may be guided into the output reflection part 220 (FIG. 9).

The case where only one diffusion part 200 is provided common to a plurality of transparent media 20 has been illustrated, but the diffusion parts 200 may be provided in a one-to-one correspondence with the transparent media 20.

As described above, according to the optical coupler according to the invention, if the number of outputs increases, sufficiently strong joint with a large number of optical fibers can be held and the signal loss can be lessened.

According to the optical coupler according to the invention, the signal loss can be held low because of the simple structure of the joint portion with optical fibers.

According to the optical coupler according to the invention, an optical signal can be split into a large number of branches.

What is claimed is:

1. An optical coupler comprising:

a light split device for receiving an optical signal incident from at least one incidence section placed on a light incidence/emission plane, splitting the incident optical signal into a plurality of optical signals, and emitting the optical signals from a plurality of emission sections placed on the light incidence/emission plane; and a light guide acceptance member including an acceptance section for accepting:

at least one incidence light guide for guiding an optical signal into the at least one incidence section; and a plurality of emission light guides for guiding the optical signal emitted from the plurality of emission sections, respectively, the plurality of emission light guides placed on the light incidence/emission plane, wherein:

the light split device has at least one sheet-like transparent medium each being formed as a shape having a plurality of steps, the transparent medium for splitting the incidence optical signal;

each of the at least one transparent medium includes:

the incidence/emission plane of the light split device;

the at least one incidence section;

at least one first reflection section;

a plurality of second reflection sections; and the emission sections;

the emission sections are provided in a one-to-one correspondence with the steps of the transparent medium;

the plurality of second reflection sections are provided in a one-to-one correspondence with the steps of the transparent medium;

the at least one first reflection section is provided in a one-to-one correspondence with the at least one incidence section and reflects the optical signal incident from the at least one incidence section in a direction of the second reflection sections;

the transparent medium guides the reflected optical signals into the second reflection sections, respectively and;

the second reflection sections reflect the guided optical signals and emit from the plurality of emission sections, respectively.

2. The optical coupler according to claim 1, wherein the light split device is formed in a thin plate like;

wherein the at least one incidence section and/or the plurality of emission sections are on a main plane of the light split device; and wherein the acceptance section is shaped so as to accept the incidence light guides and the emission light guides toward a main plane side.

3. The optical coupler according to claim 2, wherein the incidence light guides and the emission light guides are optical fibers collected in connectors; and wherein the light guide acceptance member has the acceptance section to which the connectors for collecting the optical fibers are fitted; and wherein the light guide acceptance member further has a plurality of openings so that end faces of the optical fibers collected in the connectors abut against the at least one incidence section and the emission sections on the light incidence/emission plane, respectively.

4. The optical coupler according to claim 3, wherein the light guide acceptance member is formed in a plate; and wherein the light guide acceptance member is disposed on the main plane of the light split device.

5. The optical coupler according to claim 4, further comprising a support member, wherein the light split device is sandwiched between the support member and the light guide acceptance member.

6. The optical coupler according to claim 2, wherein the at least one incidence section is placed on the incidence/emission plane.

7. The optical coupler according to claim 1, wherein the light guide acceptance member is formed of a light shielding material.

8. An optical coupler comprising:

a light split device for receiving an optical signal incident from at least one incidence section placed on a first plane, splitting the incident optical signal into a plurality of optical signals, and emitting the optical signals from a plurality of emission sections placed on a second plane;

a retention member for retaining the light split device;

at least one first light guide for guiding an optical signal into the at least one incidence section placed on the first plane from a light incidence/emission plane of the retention member;

a plurality of second light guides for guiding each of the optical signals from each of the plurality of emission sections placed on the second plane into the light incidence/emission plane of the retention member; and a light guide acceptance member having an acceptance section for accepting a plurality of third light guides each for guiding the optical signal between the first light guide and third light guides and guiding the optical signals between the second light guides and the third light guides, the third light guides placed on the light incidence/emission plane of the retention member.

9. The optical coupler according to claim 8, wherein the at least one first light guide and the second light guides include a first optical fiber and second optical fibers, respectively;

wherein the plurality of third light guides include third optical fibers collected in a connector; and wherein the light guide acceptance member has:

the acceptance section to which the connector for collecting the third optical fibers is fitted; and a plurality of openings through which end faces of the third optical fibers collected in the connector abut against end faces of the first and second optical fibers.

10. The optical coupler according to claim 8, wherein the light guide acceptance member is formed in a plate and is disposed on the light incidence/emission plane of the retention member.

11. The optical coupler according to claim 8, wherein the light guide acceptance member is formed of a light shielding material.

* * * * *